United States Patent [19]
Bratlie

[11] Patent Number: 6,019,568
[45] Date of Patent: Feb. 1, 2000

[54] SPILL GATE FOR TRAILER TIPPER

[75] Inventor: Kenneth A. Bratlie, Portland, Oreg.

[73] Assignee: Columbia Trailer Co., Inc., Hillsboro, Oreg.

[21] Appl. No.: 09/326,970

[22] Filed: Jun. 7, 1999

[51] Int. Cl.[7] ................................................. B65G 67/30
[52] U.S. Cl. ........................ 414/583; 414/362; 414/368; 298/17 SG
[58] Field of Search ..................... 414/354, 362, 414/368, 376, 385, 583, 575, 577, 582, 422, 424, 414, 415; 298/23 A, 17 SG, 1 R, 22 R

[56] References Cited

U.S. PATENT DOCUMENTS

| | | | |
|---|---|---|---|
| 507,008 | 10/1893 | Housinger | 414/354 |
| 516,053 | 10/1894 | Hulett. | |
| 577,500 | 2/1897 | Wilson. | |
| 1,732,537 | 3/1929 | Robb | 414/362 |
| 1,759,757 | 5/1930 | Patten et al. . | |
| 3,118,550 | 1/1964 | Hansen | 414/362 |
| 3,779,405 | 12/1973 | Kavanaugh, Jr. | 414/362 |
| 3,819,070 | 6/1974 | Clarke et al. . | |
| 3,838,783 | 10/1974 | Tune | 414/362 |
| 3,910,364 | 10/1975 | Baker | 414/362 |
| 4,059,307 | 11/1977 | Neufeldt | 414/414 |
| 4,483,650 | 11/1984 | Sims . | |
| 4,995,780 | 2/1991 | Dietzler | 414/376 |
| 5,080,548 | 1/1992 | Bratlie et al. . | |
| 5,344,271 | 9/1994 | Bratlie et al. . | |
| 5,458,451 | 10/1995 | Bratlie et al. . | |

FOREIGN PATENT DOCUMENTS

| | | | |
|---|---|---|---|
| 865724 | 2/1953 | Germany | 414/362 |

*Primary Examiner*—Robert P. Olszewski
*Assistant Examiner*—Isobel A. Parker
*Attorney, Agent, or Firm*—Klarquist Sparkman Campbell Leigh & Whinston, LLP

[57] ABSTRACT

A portable, low-profile tipper, for dumping the contents from a trailer containing dumpable material, includes a towable, elongated frame having a back end with a deck pivotally attached thereto. The deck has a backstop for positioning the trailer during dumping. Actuators raise and lower the deck to effect dumping. The tipper includes a chute for guiding the dumpable material from the bottom of the trailer past the back end of the frame. Pivotally mounted to the deck rear end beneath the location of the rear end of a trailer supported on the deck is a gate which contains on the deck any materials spilled from the trailer during dumping until it is desired to remove the material from the deck, whereupon the gate can be opened when the tipping platform is elevated and the spilled material permitted to discharge onto a supplementary chute that guides the material away from the tipper frame.

3 Claims, 6 Drawing Sheets

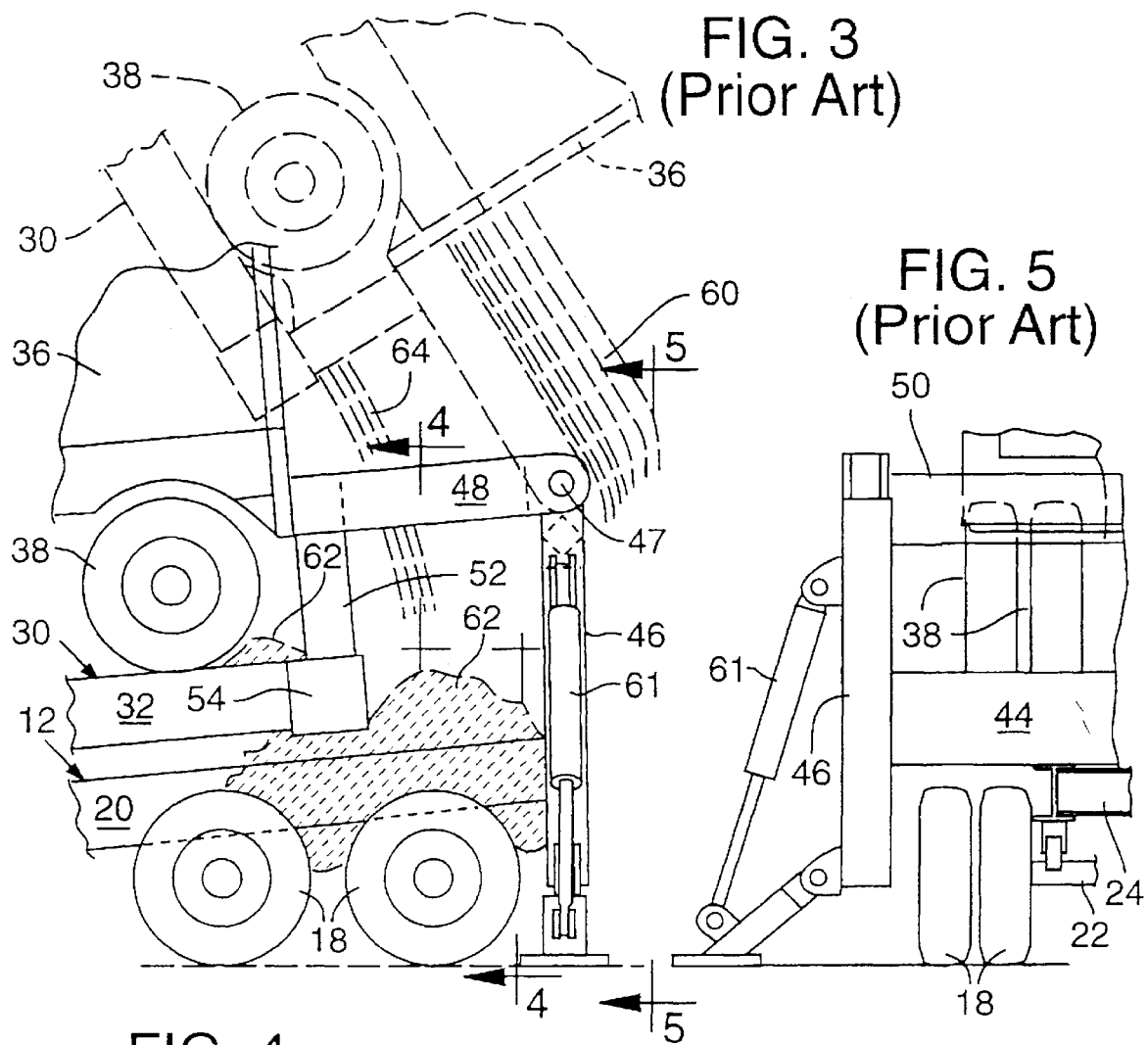
FIG. 3 (Prior Art)
FIG. 5 (Prior Art)
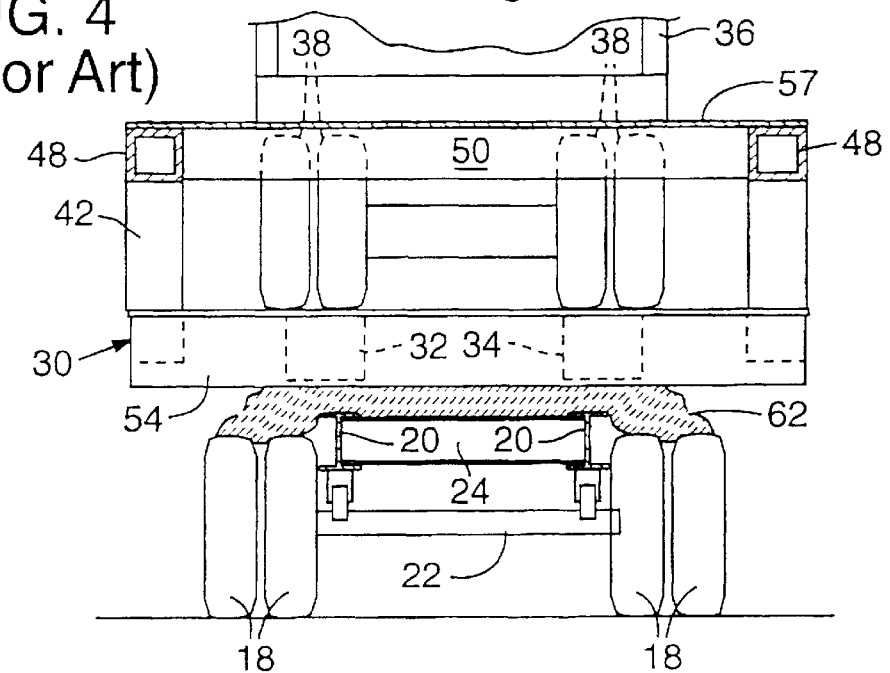
FIG. 4 (Prior Art)

SPILL GATE FOR TRAILER TIPPER

BACKGROUND OF THE INVENTION

The subject invention relates to improvements in a portable tipper for dumping the contents of a trailer through the back opening of the trailer, such tippers being shown in assignee's prior U.S. Pat. Nos. 5,080,548; 5,344,271; and 5,458,451. The tippers of each of those patents is characterized in including a towable elongated base frame, having a deck pivotally attached thereto onto which deck a trailer to be dumped may be backed. Actuators are provided for pivoting the deck about pivotal mounts at the rear end thereof so as to incline the trailer so that the contents thereof may be dumped from the back end of the trailer onto the ground for removal by other apparatus. While chutes have been provided on prior tippers to guide the material from the back of the trailer onto the ground surface, there is usually a certain amount of spillage of the material being dumped which falls upon the rear end of the deck, and which when the deck is tipped will spill onto the lower supporting frame. If not removed manually, which is a difficult and sometimes unpleasant activity due to the nature of the material being dumped, the spilled material can build up between the elevated deck and the underlying frame, which may hinder lowering of the deck completely so that the front end of the deck may be elevated several inches above the supporting base frame. If trailers are moved on or off the deck when it is in this position, the frame of the tipping deck can be permanently deformed or damage can be done to the supporting frame or the wheel axles for the base frame. Also spilled material may build up on the tipping deck beneath the wheels of trailers backed thereon which may cause the trailer to be elevated so far as to jump the backstop when it is backed onto the platform or when the platform is elevated to dump the trailer.

It is a principal object of the present invention to provide an improved trailer tipper construction having means for inhibiting the buildup of spilled material between the tipping deck and the trailer frame wheels.

Other objects and advantages of the invention will become more apparent hereinafter.

SUMMARY OF THE INVENTION

The invention is illustrated in connection with a portable tipper comprising an elongated towable frame having a front end adapted to be connected to a towing vehicle for movement of the frame from one dumping location to another, the frame having a rear end supported on a wheel assembly. Pivotally mounted to the frame rear end is a tipping platform having a deck onto which a trailer to be dumped through a rear opening may be backed by a suitable tractor, the tractor being disconnected from the trailer and removed from the tipping platform during the tipping operation. Actuators are provided to raise and lower the tipping platform between a lowered position adjacent the frame and a raised position for dumping the trailer contents through the rear opening thereof The tipper includes a chute for guiding the dumpable material from the bottom of the trailer past the back end of the frame. Pivotally mounted to the deck rear end beneath the location of the rear end of a trailer supported thereon is a gate, which serves to contain on the deck material spilled from the trailer onto the deck until it is desired to remove the material from the deck, whereupon the gate can be opened when the tipping platform is elevated and the spilled material permitted to discharge onto a supplementary chute that guides the material away from the tipper frame.

BRIEF DESCRIPTION OF THE DRAWINGS

FIG. 3 is a fragmentary schematic view of a prior art trailer dumper showing it in its dumping position in dotted lines, and illustrating the difficulty caused by the buildup of spilled material in the absence of the inventive concept.

FIG. 4 is a sectional view taken along line 4—4 of FIG. 3 further illustrating the prior art construction.

FIG. 5 is a fragmentary view taken along 5—5 of FIG. 3.

DETAILED DESCRIPTION

Figure 1:
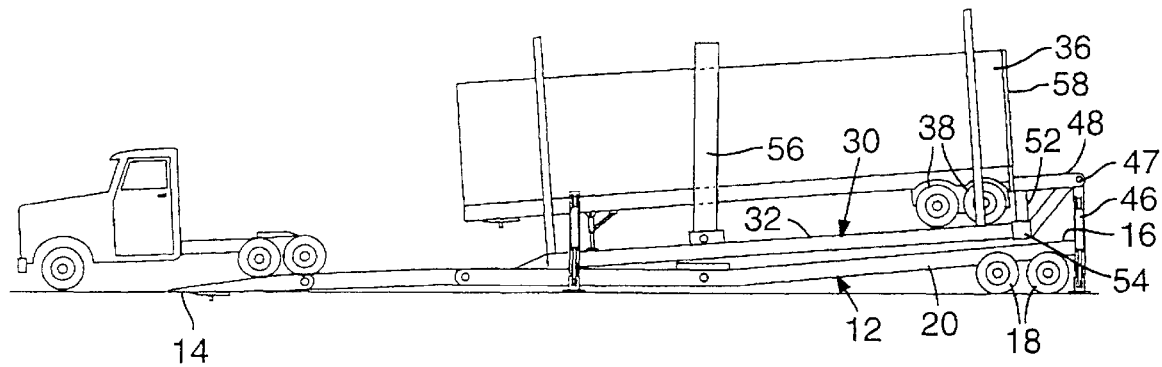
FIG. 1 is a side elevation of a trailer dumper constructed in accordance with the prior art, showing the same with a trailer positioned on the deck thereof prior to the dumping of the trailer.
Figure 2:
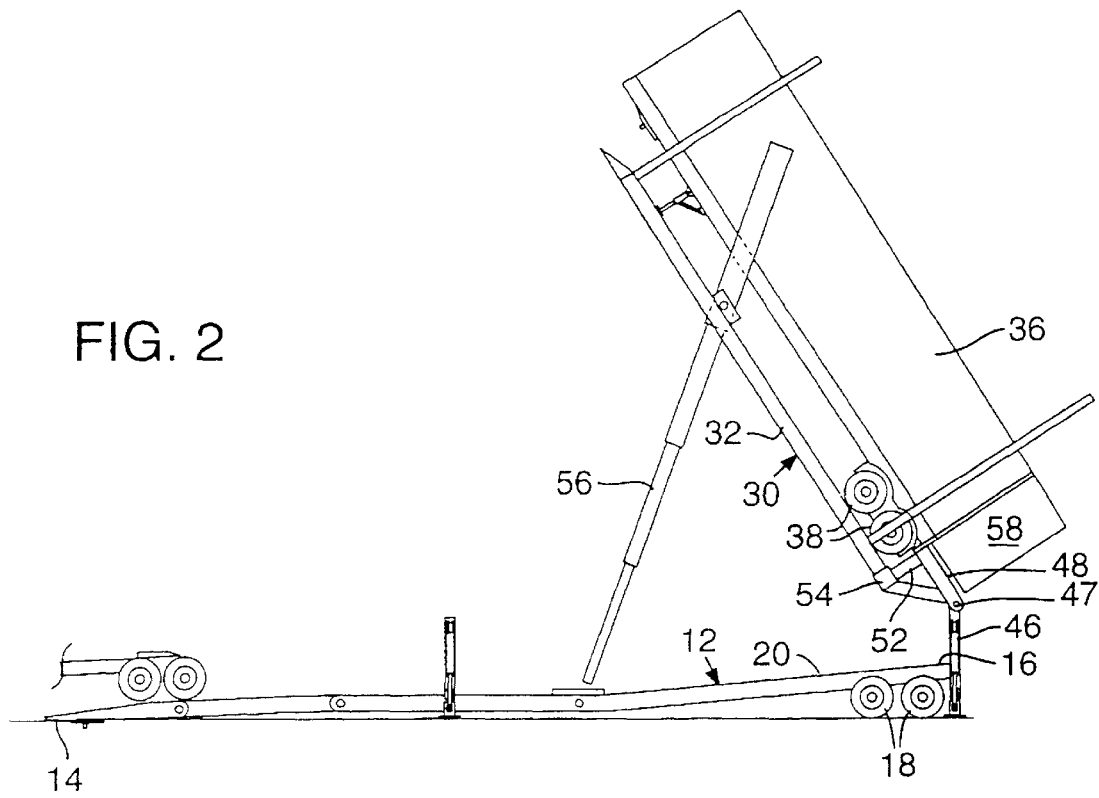
FIG. 2 is a side elevation of the trailer dumper of FIG. 1, showing the deck in elevated position to dump a load from the trailer positioned thereon.

Referring first to FIGS. 1 and 2, the trailer dumper constructed in accordance with the invention comprises a frame 12 having a front end 14 and a back end 16, the front end being adapted to be lowered and raised by any suitable hoist mechanism such as that shown in prior U.S. Pat. No. 5,458,451. The frame 12 is supported at its rearward end by wheels 18 so that the dumper can be towed to various positions for dumping of trailers.

The frame 12 comprises a pair of side beams 20 supported by the wheels 18 through a suitable axle and spring assembly 22, see FIGS. 3–5. Side beams 20 are interconnected by suitable structural steel support members, such as the I-beam 24 extending between the side beams immediately above the axle 22. Mounted to the frame 12 so as to be pivotal on an axis above the rear end of the frame is a tipping platform 30 comprising a pair of opposite stringers 32, 34 which run the length of the tipping platform immediately beneath the path of the wheels of a trailer which is to be dumped by the dumper, such a trailer being indicated at 36 and having opposite paired wheels 38.

Figure 6:
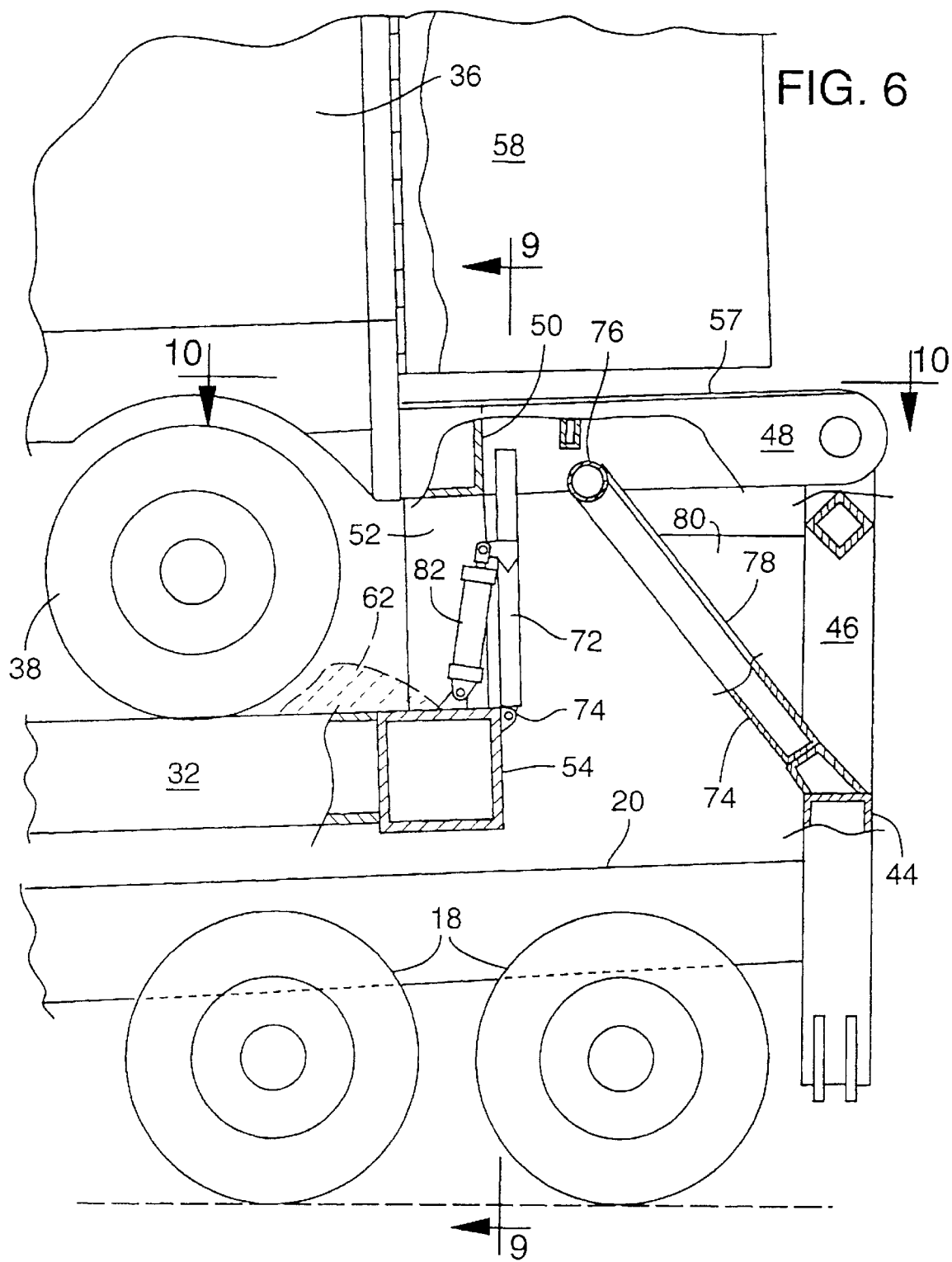
FIG. 6 is a fragmentary side elevation of the trailer dumper constructed in accordance with the invention with parts broken away and stabilizers removed.
Figure 7:
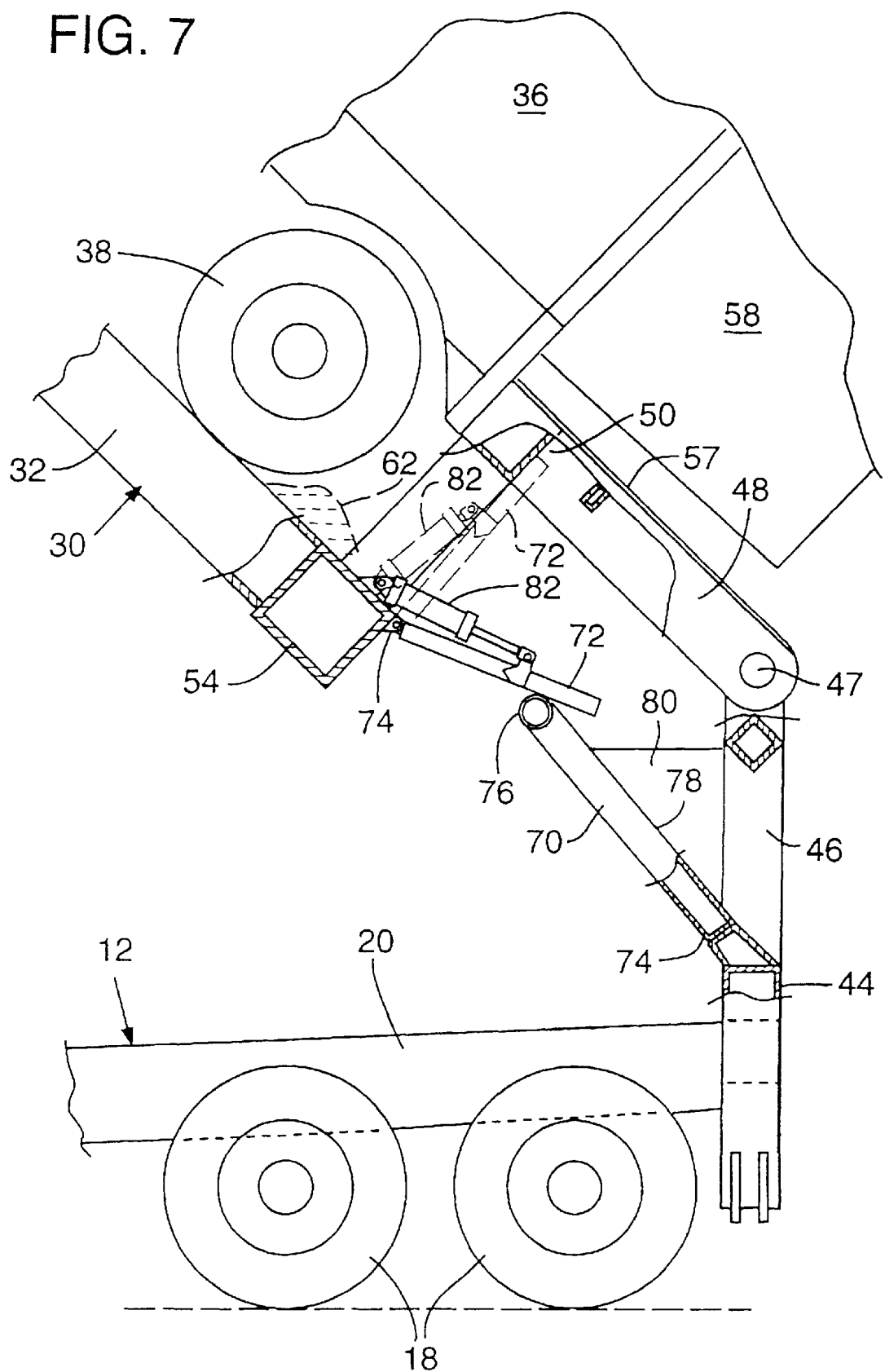
FIG. 7 is further fragmentary view of the trailer dumper of FIG. 6, showing the same in partially elevated position.

Referring to FIG. 5, secured to the rearmost ends of the beams 12 is a cross beam 44 to the opposite ends of which are connected a pair of posts 46, which are inclined at a slight angle to the longitudinal axis of the stringers so that in the dumping position of the dumper, the posts will extend vertically with respect to the earth's surface, as shown in FIG. 6. Pivotally attached, one to each post at the top thereof, is a pair of arms 48 which are interconnected at their opposite ends by a cross beam 50. The cross beam 50 is rigidly connected by a pair of posts 52 to a further cross beam 54 (see FIG. 3), secured to the stringers 32, 34 of the tipping platform 30. The cross beam 50 functions as a backstop against which a trailer 36 to be dumped is backed, as shown in FIG. 1. After disconnection of the tractor, the platform 30 may be elevated about the pivot 47 by actuation of the hoist mechanism indicated at 56. Extending across the arms 48 is a sheet of steel 57 or other suitable material which guides material spilling through the open trailer gates 58 rearwardly of the posts 46 and the rear end of the dumper frame 12, as indicated at 60 in FIG. 3. Stabilizers 61 connected to the posts 46 are operable to be lowered to support and stabilize the rear end of the frame 12 when a trailer is dumped and to be raised when the dumper is to be moved.

Referring to FIG. 3 upon opening of the sidehinged gate or gates 58 at the rear end of the trailer there is frequently spillage of material onto the rear end of the tipping platform, as indicated at 62 in FIG. 3. When the tipping platform is elevated to the dumping position as shown in dotted lines in FIG. 3, this material tends to slide off the tipping platform deck, as indicated in dotted lines 64, to fall upon the undercarriage structure such as the I-beam 24 and the frame side beams 20. This material can build up between the beams 20 and the stringers 32, 34 of the tipping platform, as indicated in FIGS. 3 and 4. The buildup between the cross beam 54 and the underlying frame side beams 20 may become such as to prevent the tipping platform 30 from lowering completely. If the tractor operator then backs his tractor onto the tipping platform to reconnect with the trailer, the load of the tractor could impose such a stress on the stringers 32, 34 as to cause the stringers to bend, or stress may be applied to the undercarriage and the axles 22, causing damage to such components.

In other instances, the spilled material 62 may build up on the tipper deck beneath the path of the wheels of a trailer to such an extent that the back of the trailer is elevated over the backstop and will jump the backstop 54 when the tipping platform is elevated to tip the trailer to dumping position. This, of course, could cause damage to the trailer and to the dumper.

Referring now to FIGS. 6–10, there is shown therein the revised structure of the tipper in accordance with the present invention. It should be understood that stabilizers such as shown at 61 in FIGS. 1–5 will be utilized in the revised structure as well. The basic structure of the tipper is the same as has been described herein before, the added features comprising the addition of a spill chute 70 and a spill gate 72. The spill chute 70 comprises a pair of opposite tubular support members 74 extending angularly upwardly from the cross beam 44 and connected at their top ends by a tubular element 76. A plate 78 extends between the tubular side elements 74 and the top element 76 to guide material deposited thereon downwardly and backwardly onto the ground behind the dumper. Side panels 80 extend between the opposite side edges of the plate 78 and the posts 46, the panels being fixedly secured both to the plate 78 and the posts 46 whereby to help lend support to the spill chute.

Figure 8:
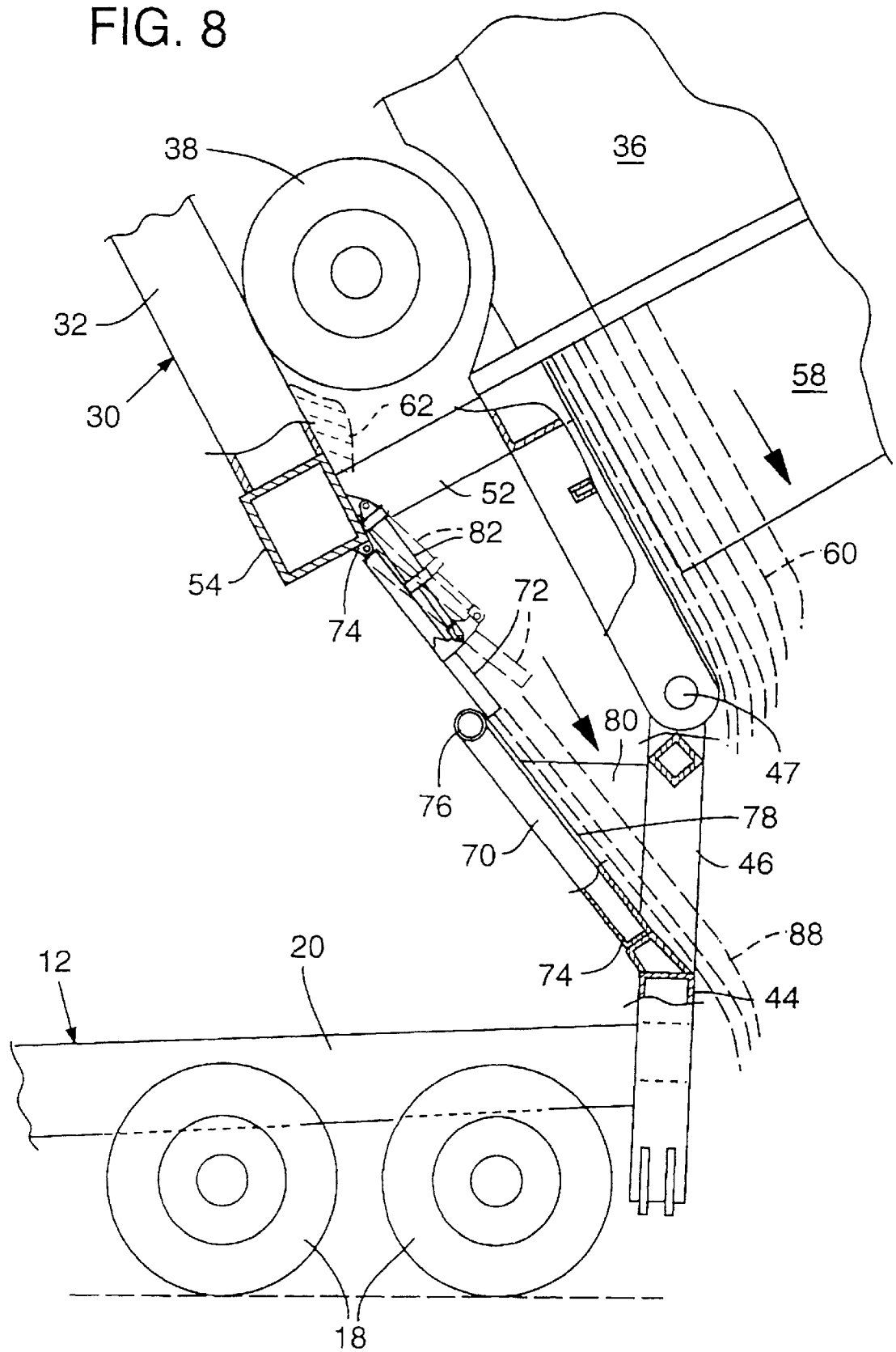
FIG. 8 is a view similar to FIG. 7 showing the trailer dumper in fully elevated position.
Figure 9:
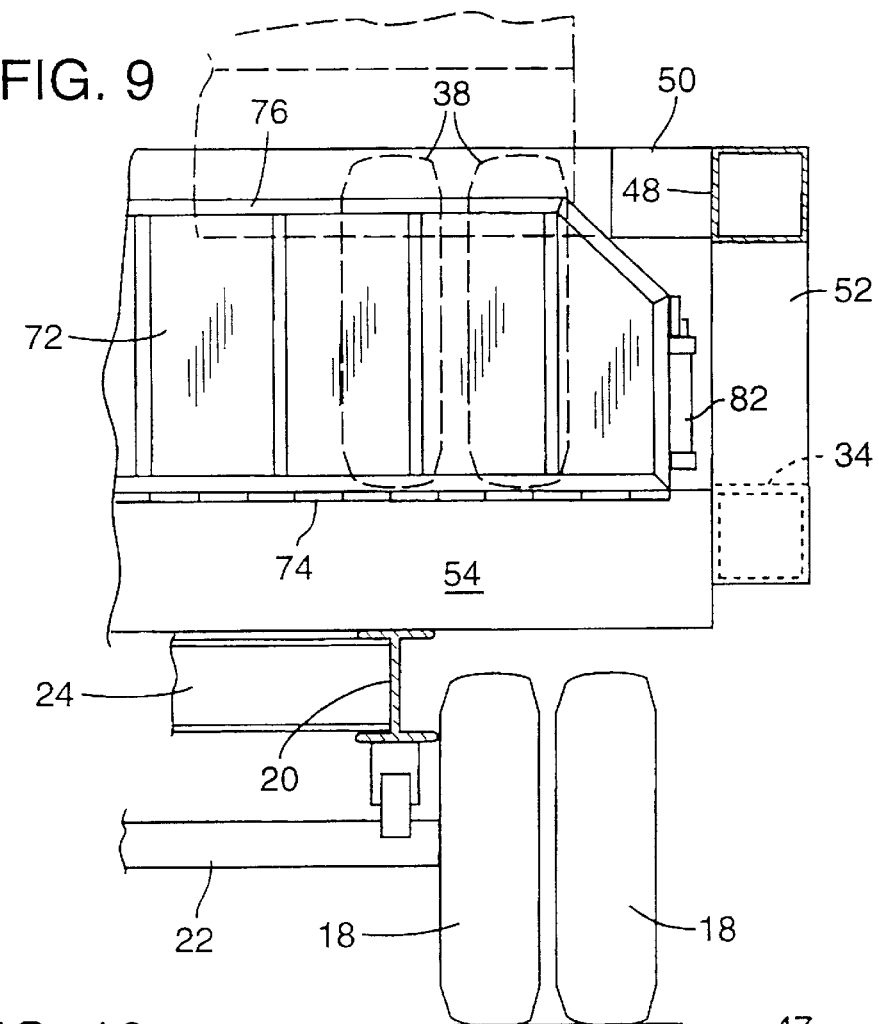
FIG. 9 is a fragmentary sectional view taken along line 9—9 of FIG. 6.
Figure 10:
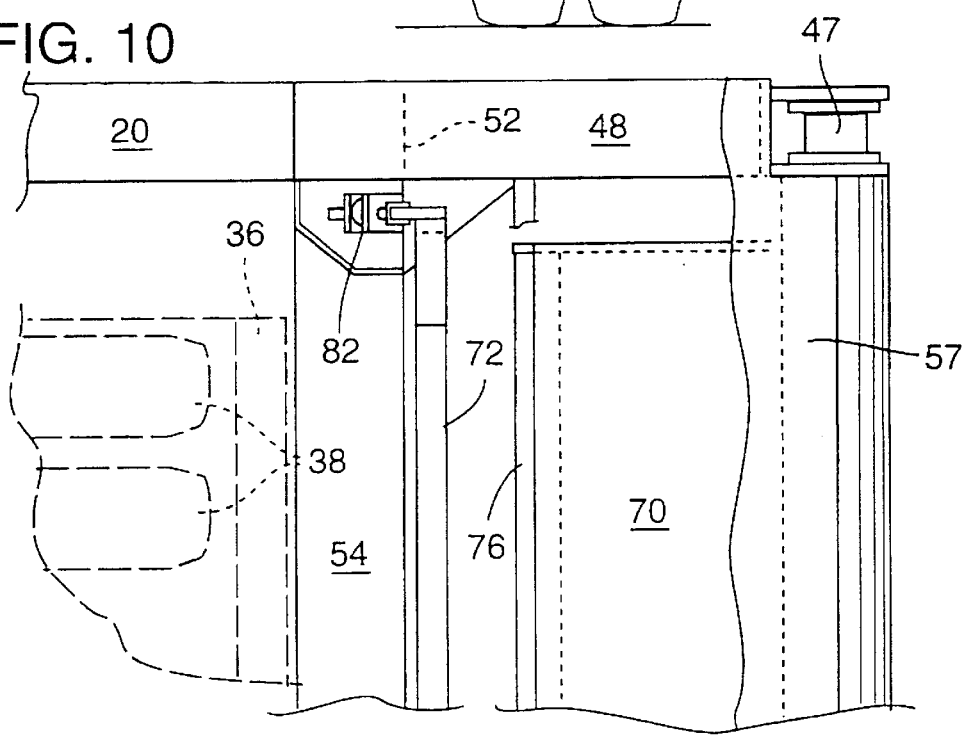
FIG. 10 is a fragmentary sectional view taken along line 10—10 of FIG. 6.

The spill gate 72 is pivotally mounted by pivots 74 to the cross beam 54 at the rear end of the tipping platform. A hydraulic cylinder and piston 82 is connected between the gate 72 and the cross beam 54, as shown in FIGS. 6, 8. Suitable known control means (not shown) are provided to operate the cylinder and piston 82 to lower the gate from the raised position shown in FIG. 6 to its lowered position shown in FIG. 8. Depending upon the amount of spilled material 62 that is accumulated upon the deck of the tipping platform 30, the gate 72 can be maintained in raised position when a trailer is dumped, or it may be moved to its lowered position whereupon the spilled material 62 will slide down the gate and through the spill chute 70 so as to be discharged to the rear end of the trailer dumper, as indicated at 88 in FIG. 8, thereby avoiding accumulation of material over the wheels 18 and their supporting assembly and the frame side beams 20. When the tipper platform is lowered, the gate will be retracted to its raised position, as shown in dotted lines in FIG. 7, and in solid lines in FIG. 6.

Having illustrated and described a preferred embodiment of the invention, it will be apparent to those skilled in the art that the invention permits of modification in arrangement and detail. I claim all such modifications as come within the scope and purview of the appended claims.

What is claimed is:

1. In a trailer dumper for dumping the contents of a trailer containing a dumpable material through a back opening of the trailer, said trailer dumper comprising an elongated frame having front and back ends, a tipping platform having front and back ends positioned over said frame, said platform having an upper deck having front and back ends, and pivot means pivotally connecting the back ends of said frame and said platform whereby the platform may be tipped about the axis of said pivot means to permit the contents of a trailer positioned on said platform with its back opening adjacent said platform back end to be dumped, the improvement comprising a gate means pivotally mounted on said platform back end for movement between a first position extending perpendicularly to said platform deck and a second position extending parallel to said deck whereby spilled material accumulating on said platform deck may be contained thereon by said gate when said gate is in said first position, and said spilled material accumulating on said platform deck will be guided by said gate, when said gate is in said second position, to a first area spaced rearwardly of said platform back end upon tipping of said platform to a dumping position.

2. A trailer dumper according to claim 1 including a chute mounted upon said frame for receiving spilled material sliding off of said gate in said second position and guiding the spilled material to a second area spaced rearwardly of said first area.

3. A trailer dumper for dumping the contents of a trailer containing a dumpable material through a back opening of the trailer comprising, an elongated frame having front and back ends and including a pair of longitudinal side beams, an elongated tipping platform having front and back ends positioned over said frame, and including a pair of longitudinal stringers and a deck extending across said stringers, said side beams extending rearwardly of said platform back end, a pair of laterally spaced first posts supported from said side beams a predetermined distance rearwardly of said platform back end, a pair of arms each having a first end and a second end pivotally mounted by a first end one on each of said first posts for rotation about a common horizontal axis, said arms being pivotable between a horizontal position extending towards said platform rear end and an angular position extending upwardly at an acute angle from said horizontal position, a pair of second posts each having a top end and a bottom end fixed at said top end one to each of the second ends of said arms, and means fixing said posts at their bottom ends to said stringers at said platform rear end, a deck extending across said arms for receiving dumped material from a trailer when said dumper is in dumping position and guiding the dumped material rearwardly of said first posts, elevating means operatively arranged between said frame and said tipping platform for pivotally raising and lowering said tipping platform about said horizontal axis, a gate pivotally mounted on said platform rear end and adapted to extend substantially between said second posts, said gate being pivotal between a first position extending substantially perpendicular to said platform deck and between said second posts and a second position extending rearwardly of said platform rear end substantially parallel to and coplanar with said platform deck, means operatively connected to said gate for effecting movement of the gate between said first and second positions, and chute means mounted to said first posts and extending angularly upwardly from a point adjacent the bottom of said first posts toward said posts for receiving spilled material sliding off said gate when said tipping platform is elevated to a dumping position and said gate is moved to said second position thereof and guiding said spilled material to an area rearwardly of said trailer dumper.

* * * * *